(12) United States Patent
Ainspan et al.

(10) Patent No.: US 7,168,853 B2
(45) Date of Patent: Jan. 30, 2007

(54) DIGITAL MEASURING SYSTEM AND METHOD FOR INTEGRATED CIRCUIT CHIP OPERATING PARAMETERS

(75) Inventors: Herschel Ainspan, New Hempstead, NY (US); Philip G. Emma, Danbury, CT (US); Rick A. Rand, Somers, NY (US); Arthur Zingher, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 10/339,992

(22) Filed: Jan. 10, 2003

(65) Prior Publication Data

US 2004/0136436 A1  Jul. 15, 2004

(51) Int. Cl.
*G01K 1/00* (2006.01)
*G01K 13/00* (2006.01)

(52) U.S. Cl. .............. 374/170; 374/163; 327/513; 702/130

(58) Field of Classification Search .......... 374/170, 374/171, 163; 702/130, 133
See application file for complete search history.

(56) References Cited

U.S. PATENT DOCUMENTS

| 4,549,818 | A | * | 10/1985 | Nishikubo et al. .......... 374/178 |
|---|---|---|---|---|
| 5,349,685 | A | * | 9/1994 | Houlberg .................... 712/40 |
| 5,805,403 | A | * | 9/1998 | Chemla ..................... 361/103 |
| 6,028,472 | A | * | 2/2000 | Nagumo ..................... 327/512 |
| 6,283,628 | B1 | * | 9/2001 | Goodwin ........................ 374/1 |
| 6,370,558 | B1 | * | 4/2002 | Guttag et al. ............... 708/603 |
| 6,630,754 | B1 | * | 10/2003 | Pippin ........................ 307/117 |
| 6,678,625 | B1 | * | 1/2004 | Reise et al. ................. 702/117 |
| 6,695,475 | B1 | * | 2/2004 | Yin ............................. 374/171 |
| 6,779,060 | B1 | * | 8/2004 | Azvine et al. ................ 710/65 |
| 6,783,274 | B1 | * | 8/2004 | Umeyama et al. .......... 374/178 |
| 6,814,485 | B1 | * | 11/2004 | Gauthier et al. ............ 374/170 |
| 6,937,958 | B1 | * | 8/2005 | Gold et al. ................. 702/132 |
| 6,996,491 | B1 | * | 2/2006 | Gold et al. ................. 702/132 |
| 2002/0000928 | A1 | * | 1/2002 | Heyl et al. .................. 341/155 |
| 2003/0158683 | A1 | * | 8/2003 | Gauthier et al. .............. 702/99 |
| 2003/0158696 | A1 | * | 8/2003 | Gold et al. ................. 702/132 |
| 2004/0004994 | A1 | * | 1/2004 | Wu et al. .................... 374/170 |
| 2004/0105488 | A1 | * | 6/2004 | Felder ........................ 374/170 |
| 2004/0135643 | A1 | * | 7/2004 | Clabes et al. ................ 331/57 |
| 2004/0190585 | A1 | * | 9/2004 | Berndlmaier et al. .......... 374/1 |
| 2005/0040810 | A1 | * | 2/2005 | Poirier et al. ............ 324/158.1 |

\* cited by examiner

*Primary Examiner*—Gail Verbitsky
(74) *Attorney, Agent, or Firm*—F. ChaU & Associates LLC

(57) ABSTRACT

This invention relates to digitally measuring operating parameters, for example, temperature, within a semiconductor chip and making those measurements internally available to hardware, firmware, and software.

4 Claims, 4 Drawing Sheets

DIGITAL MEASURING SYSTEM AND METHOD FOR INTEGRATED CIRCUIT CHIP OPERATING PARAMETERS

FIELD OF THE INVENTION

This invention relates to digitally measuring operating parameters within a semiconductor chip and making those measurements internally available to hardware, firmware, and software.

BACKGROUND OF THE INVENTION

It is known to measure operating parameters within a chip, insofar as temperature is concerned. For example, the Intel Pentium 4 Processor includes an on-die thermal diode, as described by Intel in the Data Sheet and the Thermal Design Guidelines for this chip. The Pentium 4 uses a dedicated off-chip connection for an analogue output signal which indicates temperature.

When the Pentium 4 thermal diode senses excessive temperature, a signal is made externally available by the off-chip connection. External circuitry then causes the system clock to be intermittently frozen. This decreases the average clock rate, which decreases the average power dissipation, which decreases the temperature.

This design has several significant disadvantages, among which is that each processor must be individually calibrated. Also, this analogue design requires fabrication of both analogue and digital devices on the same chip, using the same production line. This places extra requirements on process control, and may add extra processing costs.

Moreover, the Pentium 4 design does not enable software monitoring of temperature and does not enable software control of the response to the temperature measurement.

Further, the prior art is solely concerned with temperature when monitoring internal physical parameters. It is now apparent that monitoring of other internal physical parameters, such as power consumption, will also be necessary to advance the semiconductor art.

What is needed is a means for making measured operating parameters available to the system software so as to permit the system to respond in a manner with all the sophistication that software logic makes available. What is also needed is to use this software accessibility to eliminate the need for factory calibration and to eliminate the need for dedicated connections.

SUMMARY OF THE INVENTION

A method, system, and integrated circuit chip for measuring physical parameters of integrated circuit chips comprising obtaining a value of at least one of a plurality of physical parameters of at least one of a plurality of integrated circuit chips and digitally communicating the value to a plurality of other devices as well as, digitally communicating the value to at least one of a plurality of software instructions.

DETAILED DESCRIPTION OF PREFERRED EMBODIMENTS

Figure 1:
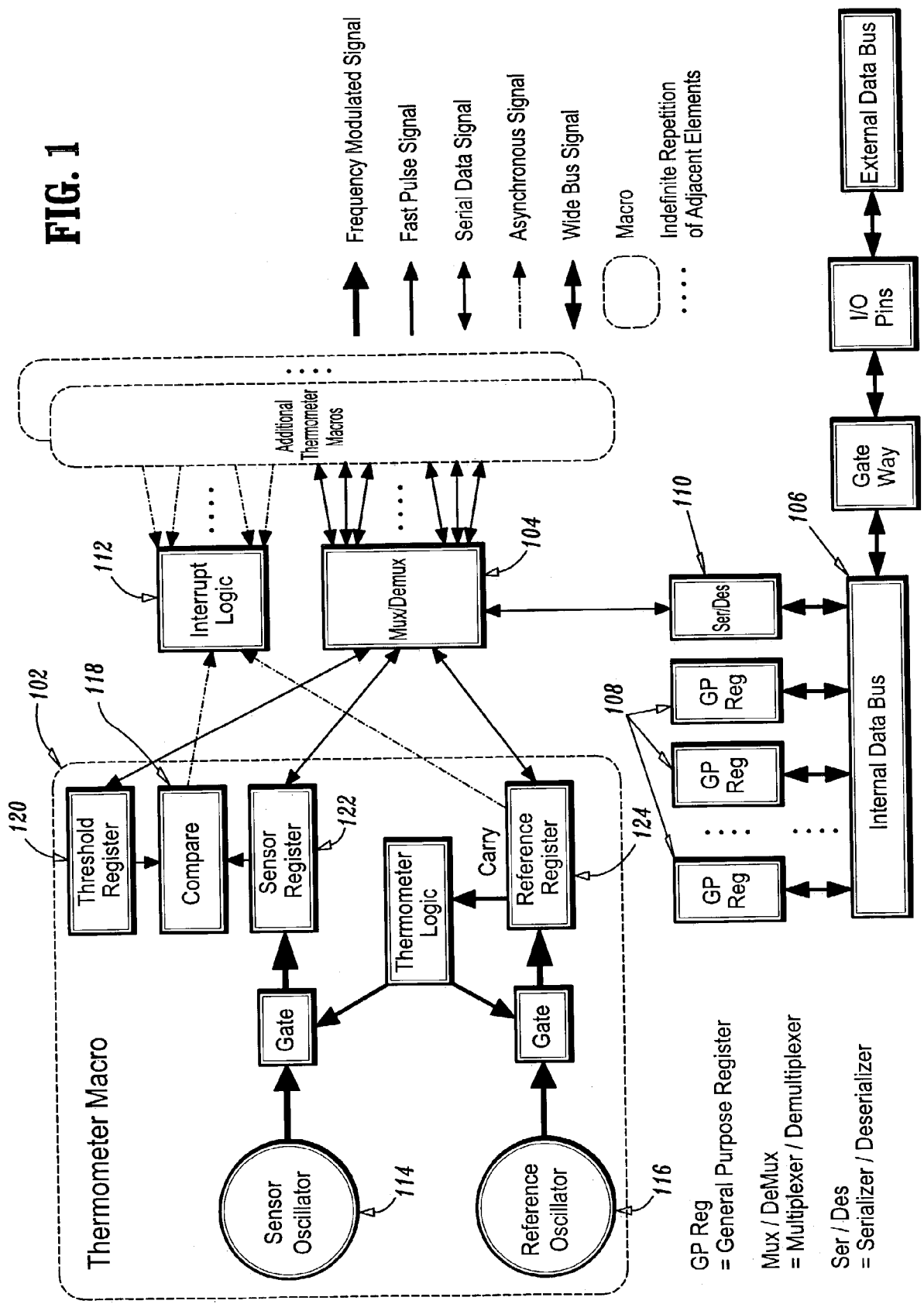
FIG. 1 is an embodiment of a integrated circuit design layout having a digital measuring system according to the present invention.

Interrupts are events that are (typically) asynchronous with respect to the instruction stream. They are (usually) triggered by external activities, and manifest themselves via simple hardware signals. The interrupt hardware is not specifically a function of the Instruction Unit (IU) or the Execution Unit (EU), although it could physically reside in either. When an interrupt is posted to this hardware, internal logic comprising masks that are set by software determines when the interrupt can be "taken" by the software.

By definition, an atomic software component cannot be interrupted. Once started, an atomic component will be completed before an interrupt may be taken. An atomic component could be a single instruction or a sequence of instructions between the setting and clearing of some interrupt mask.

When an interrupt is posted, then, following the completion of an atomic component of the software, the nominal instruction flow is interrupted. Instead of proceeding with the instruction sequence that had been in progress, control is switched to a routine called an interrupt handler that may be specific to the type of interrupt that occurred.

Following completion of the interrupt handler, control is returned to the original instruction stream at the point at which it was interrupted. Essentially, the interrupt behaves exactly like a subroutine call, except that it is triggered by hardware, and it is autonomous with respect to the program(s) that are nominally running. In other words, it is not explicitly triggered by software, and it is asynchronous with respect to the running program(s).

Instruction Unit & Millicode

The Instruction Unit (IU) is responsible for sequencing instruction flow, for example, determining the addresses of the instructions to be executed, fetching the instructions to be executed, and decoding and ordering those instructions into a queue from which instructions are dispatched to the rest of the machine for execution and other associated functions.

An instruction is nominally an encoding of bits that is predefined by the Instruction Set Architecture (ISA), sometimes simply called Architecture. The ISA is a defined set of instructions that will constitute any program that is to be executed by a computer. As just described, the IU is responsible for reading in that program, decoding it, and dispatching the instructions for execution.

From the point of view of a program, the computer only "knows" (can recognize and execute) instructions that belong to the ISA, which is a closed set. Millicode is a hardware/software "trick" that allows for instructions in the ISA to be replaced by a sequence of millicode instructions. Millicode also has a closed predefined architecture that is known to the hardware, but invisible to the software. Millicode allows for flexibility in implementing instructions in the ISA. Typically, millicode instructions are very simple (i.e., easy to implement correctly in hardwired circuits), and millicode sequences are used to implement those instructions in an ISA that are complex (i.e., hard to implement correctly—without modifications—in hardware). In this way, if a millicode implementation of a complex instruction proves to be flawed, it can be fixed by changing the millicode sequence without changing the hardware.

Typically, most ISA instructions are directly implemented in hardware. Other ISA instructions may be implemented in millicode, and the IU "knows" this. Suppose the IU encounters such an instruction. The decoding process generates the address of the appropriate millicode routine, sets a bit which indicates millicode mode, and redirects instruction flow to the beginning of the millicode routine. When the millicode routine is completed, the machine resets the millicode mode bit, and execution proceeds with the next instruction after the millicoded instruction.

Thus, execution of a millicode routine behaves exactly like a subroutine call. In this case, it is synchronous with respect to the instruction stream (it is triggered by the decoding of certain predefined instructions in the ISA), but it is not "visible" to the software. That is, the software cannot tell whether an ISA instruction is implemented by millicode or directly in hardware. As stated, millicode is a method that allows for simplification and flexibility in the hardware implementation.

Software Instructions and Policies

CPU chips and some other IC chips are typically controlled by software instructions. Typically, an Instruction Set Architecture (ISA) specifies the format and effects of each instruction which the IC Chip supports.

Typically, an ISA and IC Chip are designed to form a generation in a technological family, which spans several technological generations with a design policy of "forward compatibility". Suppose software is consistent with one generation of the ISA, and executes correctly on that generation of IC Chip. Forward compatibility is an explicit guarantee that this software will execute similarly in later generations. This policy makes it easy to move software to later generations. This is commercially important to grow the market for a technology family.

Forward compatibility constrains later generations of IC Chips and ISAs, constrains technological improvement, and typically leads to very cautious updating of the ISA. This is suitable to add new features which are already very well understood.

However, other features may be less understood. These may require several iterations to reach the best design, before they are mature enough to be frozen into the ISA and its forward compatibility. Therefore, different design policies are typically used for less mature or tentative features.

Some instructions can be hidden. These are not openly specified by the ISA, and are not guaranteed by forward compatibility. This design policy is typically used to explore tentative features, which can be evaluated by a small team of programmers, with close ties to the technology family. These instructions are hidden from the general programmers.

Some instructions are restricted. These can be invoked only by subroutines with special privileges. This design policy is typically useful for supervisor-level instructions, used only by a special team of programmers, with close ties to the technology family. Application programmers are typically restricted from using these instructions.

Thus, the repository of instructions may go beyond the ISA and is understood to include fully specified, hidden, unrestricted, and restricted instructions.

CPU Chip Generalizations

The present invention is directly applicable to a CPU chip. In addition, the present invention is applicable to many other complex digital circuits and chips as well. For example, other subsystems, such as a display controller, memory controller or storage system controller, may have similar busses, and this invention would be readily implemented in such devices.

FIG. 1 shows an embodiment of a integrated circuit design layout having a digital measuring system according to an embodiment of the present invention. In this case, the sensor is a thermometer, but it is apparent that the teachings of the invention are applicable to any suitable sensor, such as power or current sensors. In the diagram, there is a section referred to as the Thermometer Macro 102. This contains circuits dedicated to sensor functions. The other circuits would already be implemented on a typical complex IC. These other circuits typically include multipurpose busses and registers, as well as the existing I/O pins.

The Thermometer Macro 102 includes components that can sense temperature. The macro includes a sensor oscillator 114, reference oscillator 116, and their associated logic and registers. The sensor measurement is transferred through multiplex/demultiplex circuits 104 to the data bus 106. This arrangement allows for a minimal wiring implementation which is consistent with the very low bandwidth nature of this information. Optionally, this could be a parallel bus to a general purpose register 108, similar to any other system.

The system can activate a thermometer subsystem to measure the immediate temperature. This may be done by explicit software instructions or may be done periodically based on some timer. The latter is often called "polling".

Additionally, a Thermometer Macro optionally may include a compare 118 and threshold 120 section. There is an initialization function, to set the threshold values. This enables the chip to self-monitor its temperature. When necessary, this generates a system interrupt, which triggers appropriate action by interrupt logic 112.

Temperature measurement is very slow compared to the CPU clock, and exact timing may vary with temperature. This may be true of other sensors as well. Thus, it is difficult to predict the number of CPU cycles for sensor measurement and the completion of temperature measurement is effectively asynchronous compared to the instruction stream. Another interrupt mechanism can efficiently indicate when the temperature measurement is available. Different priority levels may be assigned to the various interrupt signals.

Oscillator Operation and Details:

In a preferred embodiment, the temperature sensor is an oscillator, having a plurality of inverters connected in a ring. Also, there is a bias generator, which emits an analogue voltage signal (bias) that corresponds to temperature. This bias is fed to each inverter, where it adjusts the timing of the inverter. Thus, the frequency of the sensor-oscillator corresponds to the temperature.

In a realistic system, there may be perturbations in the power supply voltage. The bias generator voltage and the sensor frequency both ought to be undisturbed by such perturbations.

A preferred embodiment for a temperature sensor includes a ring oscillator controlled by a bias generator. The overall bias generator includes several smaller bias generators, some with positive sensitivity to power supply or temperature, and others with negative sensitivity to power supply or temperature. In the overall generator, the outputs of these individual generators are summed together, with appropriate coefficients, to produce an overall bias signal with the desired sensitivity. The coefficients are designed to produce approximately zero overall sensitivity to temperature, and approximately zero overall sensitivity to power supply. This is directly suitable for an embodiment of a Reference Oscillator.

To make a Temperature Sensor, the sensor oscillator is made highly sensitive to temperature, but has approximately zero overall sensitivity to power supply.

Thermometer Operation

FIG. 1 shows a preferred embodiment of the present invention. Each Thermometer Macro 102 can provide a digital measured value that can be communicated through serial data signals. The serial data signals can be concentrated/unconcentrated by a Multiplexer/Demultiplexer (Mux/Demux) 104, then the serial data signals can be further serialized/deserialized by a Serializer/Deserializer (Ser/Des) 110, and communicated to an Internal Data Bus 106, that further communicates the serial data signals to a General Purpose Register (GPR) 108 for storage of the digital measured value. Also, the Thermometer Macro can provide asynchronous signals connected to an Interrupt Handler 112 for invoking additional types of processing, for example, CPU task reallocation. In integrated circuit design, it is important to minimize long wires, especially near the GPRs. Therefore, this embodiment uses serial data signals, even though it adds a few gates and a little latency.

The temperature is measured by the ratio (Temperature Sensor Register)/(Temperature Reference Register) This division is particularly simple if the denominator is exactly a power of 2. In some cases, it may be convenient to subtract 1 from this ratio. The remainder may be expressed in various arithmetic formats (8, 16, 32 bits, fixed or floating numbers).

Thermometer Functions and Software instructions

In a preferred embodiment, the software can interact with the thermometer, including control of its functions, and response to the measured temperature. Preferably, software instructions are provided to control, among plural thermometers, specifying which thermometer to use for subsequent actions, and among plural GPRs, specifying which GPR to use for subsequent actions. The following are examples of instructions that can relate to the specified thermometer and specified GPR. Measure temperature, Read out temperature measurement from thermometer to GPR, Reset thermometer, Set temperature threshold, Set time interval between measurements, Set other thermometer parameters, and Reinitialize thermometer parameters to default values. These example instructions are by no means exhaustive.

In a preferred embodiment of the present invention, the temperature measurement is transferred (read out) to a General Purpose Register (GPR) 108. Here the temperature measurement is accessible for software-controlled calculations, tests, and storage. This enables very great freedom in the design of the response to abnormal temperature measurement. Simple thermometer functions may be invoked by separate instructions, combined into fewer instructions, or accomplished implicitly.

In an embodiment of the present invention, one software instruction may chain together several smaller functions, for example, Specify a thermometer, Specify a GPR, Measure temperature, Read out temperature, and Reset thermometer.

In another embodiment of the present invention, default values can implicitly provide parameters, for example, the temperature threshold, the interval between temperature measurements, and other thermometer parameters.

In another embodiment of the present invention, thermometer software instructions can be restricted and hidden. For example, thermometer software instructions are implemented in microcode. These instructions can be executed only by supervisor-level code, and these instructions are not an open part of the ISA.

In another embodiment of the present invention, thermometer software instructions can be restricted, but are fully specified by the ISA with forward compatibility.

In another embodiment of the present invention, thermometer instructions can be unrestricted and fully specified by the ISA.

A preferred embodiment of the present invention includes the features of all of the above embodiments.

In all cases, the thermometer software instructions are part of the repository of software instructions, which the hardware can execute, even though they may or may not be part of the open ISA.

Any software instruction which includes the function "Measure Temperature (MT)" is new and novel. In a preferred embodiment of the present invention, this triggers the process of temperature measurement and read-out. Also, this many specify a particular thermometer, and may specify a particular General Purpose Register (GPR). This may be part of the Instruction Set Architecture (ISA).

A set of new and novel software instructions can include the function "Set Temperature Parameter (STP)". This enables software manipulation of the temperature threshold and other thermometer details. As shown in FIG. 1, Thermometer Macro 102 includes three Temperature Registers (Temperature Threshold Register 120, Temperature Sensor Register 122, Temperature Reference Register 124), however, various other embodiments of the present invention can include any number of temperature registers. Each temperature register has a bidirectional signal to/from the Thermometer Mux/Demux 104.

In an embodiment of the present invention, the software instruction STP triggers data transfer from a GPR 108 to an internal bus 106 to a serializer/deserializer 110 to a multiplexer/demultiplexer 104 to either or both the reference register 124 or the threshold register 120.

In another embodiment of the present invention, the STP instruction includes the value to be transferred to either or both the reference register 124 or the threshold register 120.

Coordination and Timing Details

Many variables perturb the exact duration of a temperature measurement. Therefore, the completion time for instruction MT is hard to predict. Therefore MT completion is asynchronous, compared to the main instruction stream. This requires means for coordination.

One means for coordination means uses an interrupt. The Reference Register 124 sends an asynchronous signal to the Interrupt Handler 112. This triggers a transfer of the temperature data avaiable to the Mux/DeMux 104, to the Ser/Des 110, to the internal bus 106, to the GPR 108. When this is completed, an Interrupt is transmitted to the processor core.

A second means for coordination uses a Validity Tag which is polled. For example, in the GPR 108 and in the Serializer/Deserializer 110, one bit is a Validity Tag. The remaining bits hold temperature data. If Validity is 0, then the temperature data is not valid. If Validity is 1, then the temperature data is valid. When a temperature measurement starts, this Validity bit is initialized to 0. When the temperature measurement is complete, and the measurement is transferred to a GPR 108, then its Validity bit is set to 1. In order to coordinate, the software must explicitly poll the GPR Validity tag. As long as Validity is 0, then software executes a spin loop: test, wait, repeat. This loop ends when Validity is 1. Different significant levels should be assigned to different interrupts. The interrupt from the Temperature Comparator 118 typically requires high level processing. The interrupt which indicates completion of a measurement and read-out typically can be handled by lower level processing. If a Validity tag is used for coordination, this is largely handled inside the IC chip, using a spin-loop instead of a full-fledged interrupt.

Variations of the above embodiments of the present invention can include, transfer of data (Temperature Sensor Register 122 to Multiplexer/DeMultiplexer 104 to Serializer/Deserializer 110 to internal bus 106 to GPR 108) can be controlled by various levels of the system, including the Interrupt Handler 112, MilliCode, and System Software. Various levels of interrupts and tags can provide coordination. These transfers and signals can occur at various relative times.

Load Balancing

The function of an operating system is to support processes running under it. Typically, a process requires resources (memory, execution hardware, I/O, other applications, databases, etc.), security (from other users and processes), availability (sparing recovery, etc.), and acceptable performance. One of the performance functions of an operating system is a "load balancing".

The load balancer tries to organize the processes and tasks running on a computer system to ensure good throughput as well as acceptable turnaround time. For example, a load balancer might try to apportion work equally to all processors in a multiprocessor system so as to ensure equal utilization of the processor resource. To do this, the operating system needs to take into account all of the known aspects of every running process (working set size, I/O requirements, etc.), educated guesses provided by the users of those processes (expected execution time, priority, etc.), and dynamic information on the processes as they run (how long have they run thus far, what resources have they used thus far, etc.).

This third category, "dynamic information," uses data taken from running processes in progress to make predictions as to what those processes are likely to do in the future.

Thermometer Measurement Guides Load Balancing

A thermometer produces a temperature measurement digital value which is accessible to software instructions. For example, this value can be read to a multipurpose register, where software can use it for calculations and tests.

Consider a "multiprocessor" system with plural processors and plural tasks. Also, there is a Operating System or Supervisor or Load Balancer to assign tasks and processors. The Load Balancer function may be implemented as software in the Operating System, or may be distinct, such as software, firmware or hardware.

Each processor includes an integrated digital thermometer. The temperature measurements are communicated to Operating System, Supervisor or Load Balancer. The word "Supervisor" is meant to be understood to also include an Operating System or a Load Balancer. The integrated digital thermometer provides temperature measurements, as a new type of dynamic information. Depending on these temperatures, the Supervisor can modify assignments of tasks and processors.

In another embodiment of the present invention, each new task is assigned to the processor with the lowest instantaneous measured temperature.

In another embodiment of the present invention, a task with highest anticipated power is assigned to the coolest processor in the system. This will tend to smooth out extreme temperatures.

More typically, assignment is a complex process, which depends on many criteria, such as availability of stored data, etc. In this case, the Supervisor gives partial weight to processor temperature, so a cooler processor has greater probability of being assigned a new task. These concepts may be applied at various levels.

In another embodiment of the present invention, each processing unit is a general-purpose microprocessor on a separate chip, for example, multiprocesseor servers. If tasks and processors are assigned according to the prior art, then some processors may become quite hot, while others become quite cool. By contrast, this invention enables the Supervisor to modify assignment of tasks and chips, so as to balance temperatures of chips, thereby reducing the maximum temperature.

In another embodiment of the present invention, plural small microprocessors are contained on one large chip. For example, a supercomputer can have a large chip, about 20 mm by 20 mm, with about 30 processor cores. Depending on the task assignment to these processor cores, there may be significant temperature differences between the cores, even though they are on the same chip. This occurs because lateral thermal conductivity is limited, compared to cooling through the large area of the chip.

In another embodiment of the present invention, each processor core includes a bus-connected integrated digital thermometer, and the temperature measurements are fed into the Supervisor. Thus, the Supervisor can modify assignments of tasks and processor cores, and therefore balance processor temperatures.

In another embodiment of the present invention, the processors are NOT general purpose microprocessors. One example is a multiprocessor for graphics, which includes multiple graphic "engines". Graphical tasks can have a wide range of complexity, and wide range of power dissipation.

Another example is a base-station for wireless communication, which might have a multiprocessor of Digital Signal Processors (DSPs). As wireless communication continues to grow, it will provide several grades of service, with a corresponding range of bandwidths, and range of power dissipation for DSPs. In each example, there is a Supervisor which dynamically assigns tasks to processors. Under the prior art, variegated tasks can lead to unbalanced processor temperatures.

According to another embodiment of the invention, a Supervisor can modify assignments of tasks and processors (graphics engines; DSPs) and therefore balance processor temperatures.

Parameters Other Than Temperature:

By use of standard skills in relevant arts, various embodiments of the present invention can readily be generalized to a Bus-Connected Integrated Digital Measuring System for other parameters, beyond temperature, thus, enabling integration of a physical measurement device directly into digital system, without dedicated IO resources.

Figure 2:
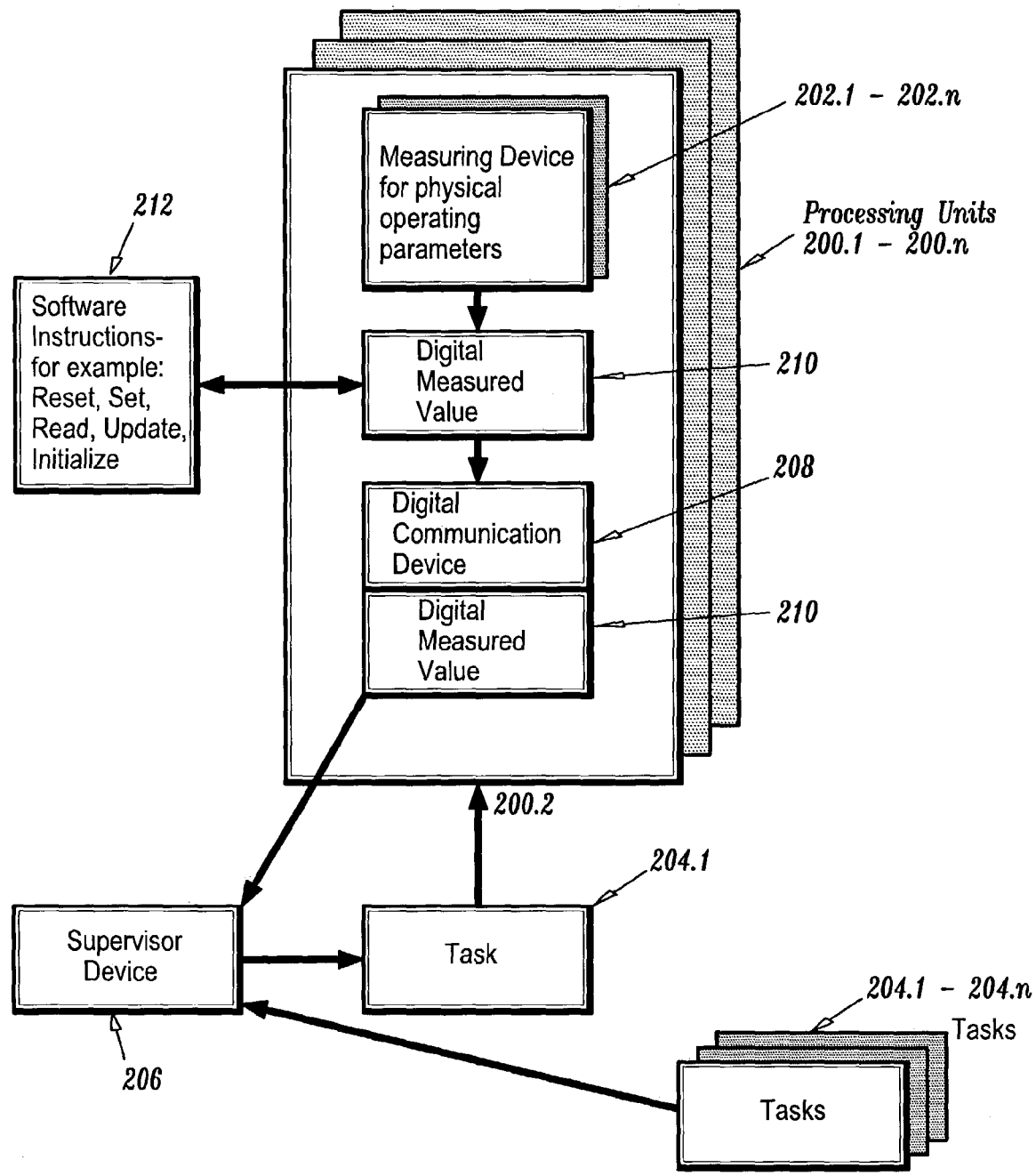
FIG. 2 is a block diagram of a digital measuring system according to the present invention.

Referring to FIG. 2, at least one of a plurality of processing units 200.1–200.n having at least one of a plurality of measuring devices 202.1–202.n contained within the at least one of a plurality of processing units 200.1–200.n are used to process at least one of a plurality of tasks 204.1–204.n. The tasks 204 are assigned to the processing units 200 by a supervisor device 206. A digital measured value 210 of a physical parameter is obtained by a measuring device 202, for example, a temperature sensor. The digital communicating device 208 communicates the measured value 210 to other devices, for example, a cooling fan and its circuitry, including the supervisor device 206. The supervisor device 206 assigns task 204.1 to the processing unit 200.2 based on the digital measured value 210. Since the measured value is digital, software instructions 212, for example, Reset, Set, Read, Update, Initialize can use, for example, binary mathematics, to operate on the digital measured value 210, to set/read/change/initialize the digital measured value 210.

Figure 3:
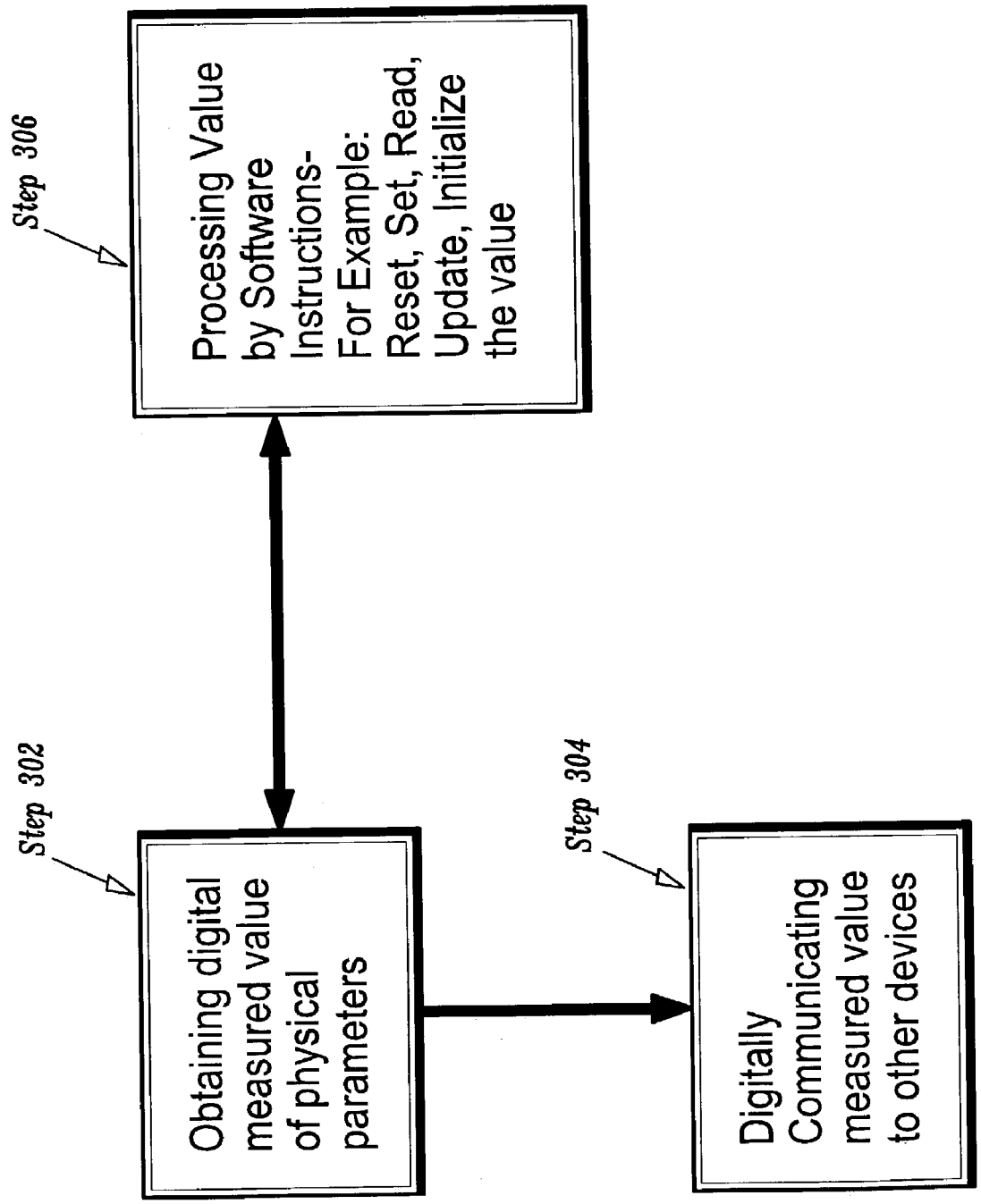
FIG. 3 is a block diagram of a method of measuring physical parameters according to the present invention.

FIG. 3 illustrates a method of measuring physical parameters according to an embodiment of the invention. The method begins by obtaining a digital measured value of at least one physical parameter of the integrated chip, for example, power supply voltage (Step 302). The digital measured value can then be communicated to other devices, for example, a voltage regulator (Step 304). The digital measured value can also be processed by software instructions (Step 306). The software instructions can process the digital measured value in a variety of ways, for example, the software instructions can update the digital measured value. Updating the digital measured value could be used to control an integrated chip's temperature.

Figure 4:
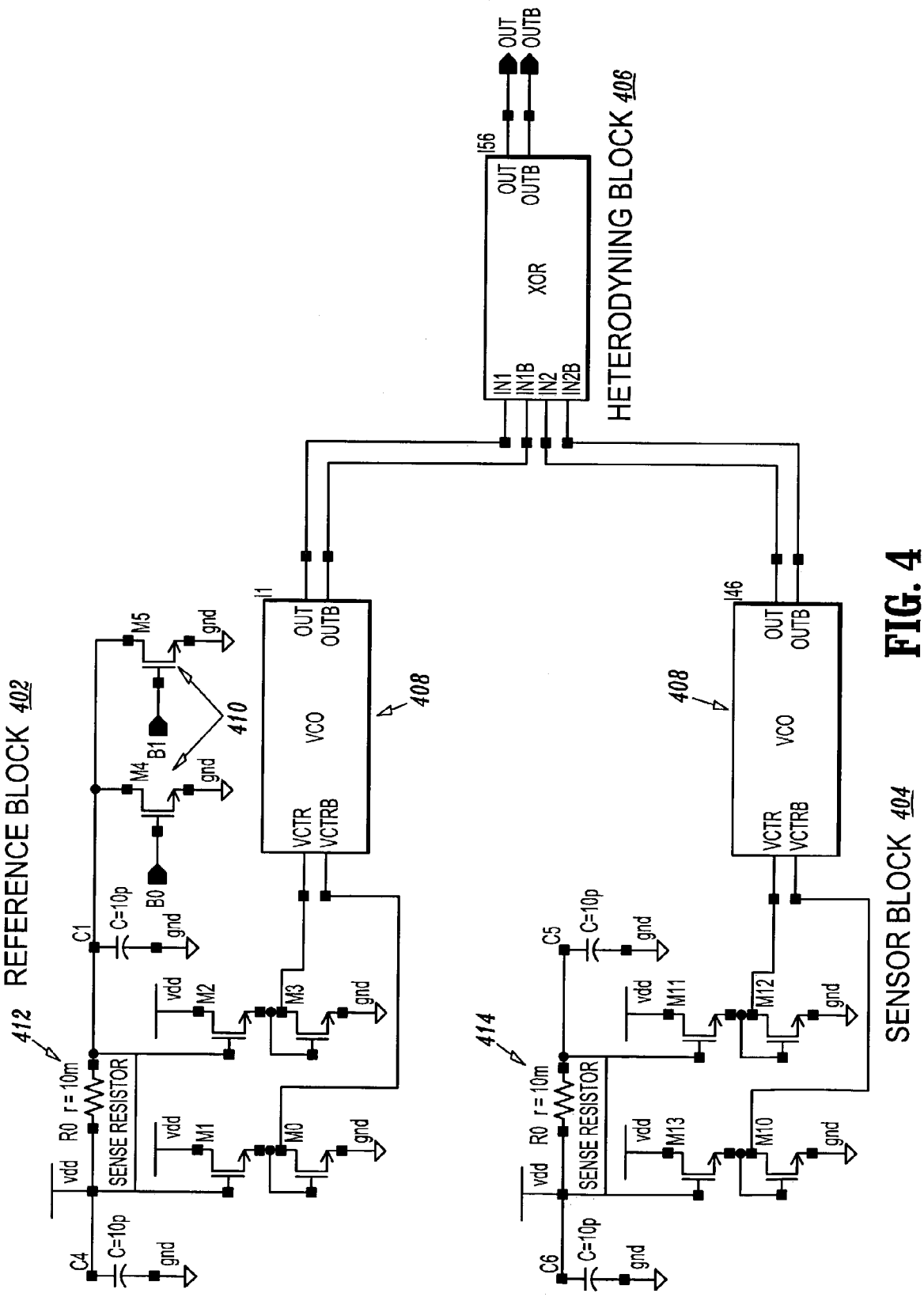
FIG. 4 is an embodiment of a supply current sensor sub-system according to the present invention.

FIG. 4 illustrates an embodiment of a supply current sensor subsystem according to an embodiment of the invention that provides a frequency proportional to DC supply current and a means of calibration to allow calculation of the magnitude of supply current. The supply current sensor subsystem comprises a reference block 402, a sensor block 404, and a heterodyning block 406 that is driven by the outputs of the reference 402 and sensor 404 blocks. The reference 402 and sensor 404 blocks each can have a resistor to convert the current to a voltage and a voltage to frequency converter, such as a voltage-controlled oscillator 408. The reference 402 and sensor 404 blocks are identical in construction except that the reference block 402 has two additional transistors 410 to allow for calibration of the supply current to frequency linear transfer function. The heterodyning block 406 provides a difference between the frequencies generated by the reference 402 and sensor 404 blocks. This difference frequency is proportional to the supply current.

The supply current sensor subsystem operates in two modes: calibration mode and sense mode. Additionally, the subsystem can also be turned off entirely, to reduce power consumption, and turned on only when a supply current measurement is requested.

In calibration mode, a portion of the chip's operating circuitry can be turned off to reduce the supply current to a low value. Such reduction can be performed during a chip's test mode, called IDDQ test mode, but additionally, can be performed during other modes of operation. Circuits to support a IDDQ test mode are typically included on a chip. The reference 402 and sensor 404 blocks remain energized. Four measurements of the difference frequency at the heterodyning block output are made, using two the two additional transistors 410 in the reference block 402. These two transistors 410 have widths in a ratio of 2:1, but can have other width ratios, and are connected to the lower-voltage side of the resistor 412. The transistors can be turned off or on by two digital signals, thus providing four states and thus four points on a line of difference frequency vs. supply current. In a first measurement, both transistors are turned off. The frequency difference between the reference 402 and sensor 404 blocks is measured. The measurement can then be repeated with one or both transistors turned on.

In sense mode, a chip operates in normal mode and the reference 402 and sensor 404 blocks are energized. A difference between the reference 402 and sensor 404 blocks can be measured. The linear relation of difference frequency vs. supply current measured during calibration mode can be used to calculate supply current that corresponds to this difference frequency. In a preferred embodiment according to the present invention, identical functions have identical layouts, and all the blocks are located physically close together on a chip layout advantageously providing good matching of transistor and metal characteristics. Additionally, signals can be all differential to reduce sensitivity of the signals to power supply noise. The resistors 412, 414 can be constructed from metal layer(s) that can be used for power supply feeder wire. In a preferred embodiment according to the present invention, a segment of the feeder wire 50 μm wide and 15 μm long can provide 10 milliohms of resistance. This segment can be placed on a metal layer above or below the balance of the feeder wire, and can be connected in series using vias. The vias define the resistor endpoints, thus removing any uncertainty of the resistance associated with current spreading in the feeder wire. The metal resistance typically could vary by +/−20% over process, however the effect of the variation on the supply current measurement is canceled by the calibration. The metal resistance typically could vary by +/−15% over temperature. However, the temperature effects both the reference 402 and sensor 404 blocks identically and thus does not effect the measurement. Source followers can be used to shift down signal voltage across the resistors, from its DC voltage that is equal to its power supply voltage, to a lower DC voltage compatible with an input voltage signal range of the voltage-controlled oscillators 408. Capacitors are used on resistor terminals to reduce power supply noise. Such capacitors are typically included in IC designs but do not have to be and thus require no additional area.

Since the subsystem illustrated is used to measure DC current, low-pass filtering provided by the capacitors is beneficial and advantageously prevents any spurious response that may arise from the reference 402 and sensor 404 blocks that have the same high-bandwidth transistor types that can be used in digital logic. The voltage-controlled oscillator 408 can be constructed from logic gates connected in a ring. The heterodyning block 406 can be a digital logic exclusive-OR (XOR) gate. Using these digital gates enhances compatibility of the subsystem with the rest of the digital chip.

One useful example of other measurements that can be made by another embodiment according to the present invention, is measurement of local power-supply voltage. This can be used to trigger appropriate action. For voltage measurement, the Sensor Oscillator 114 of FIG. 1 has weights designed to provide large sensitivity to voltage and approximately zero sensitivity to temperature. The details are similar to those in the segment "Oscillator Operation and Details".

Another example is a measurement of force or pressure. This can use strain gauges, particularly semiconductor strain gauges on the same IC as the digital electronics.

Still other examples are measurement of light or other physical phenomena.

It is to be understood that all physical quantities disclosed herein, unless explicitly indicated otherwise, are not to be construed as exactly equal to the quantity disclosed, but rather about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. An integrated circuit chip comprising:
   at least one measuring device for providing a digital value that corresponds to at least one of a plurality of physical operating parameters of said integrated chip, wherein said measuring device is contained within said integrated circuit chip;
   an on-chip monitoring system for self-monitoring measured operating parameters and generating control signals to execute functions in response to said measured operating parameters, wherein said on-chip monitoring system includes a general purpose register storing data of said digital value, a threshold register, and a reference register and upon receiving a set parameter instruction data is transferred from said general purpose register to one or both of said threshold register or said reference register, for use in producing a measurement value based on said digital value from said measuring device;
   at least one digital communication device through which said measurement value can be communicated to a plurality of other devices including a further device on said integrated circuit chip and including an internal bus connected to said general purpose register for communicating with said on-chip monitoring system,
   wherein said on-chip monitoring system further includes a serializer/deserializer connected to said internal bus and a multiplexer/demultiplexer connected between said serializer/deserializer and said threshold register for transferring data thereto; and
   an interrupt handler receiving a signal from said reference register for causing a transfer of data for said sensor register and said serializer/deserializer, and the internal bus from the general purpose register.

2. An integrated circuit chip as in claim 1, wherein said at least one measuring device measures temperature.

3. An integrated circuit chip as in claim 1, wherein said further device on said integrated circuit chip comprises a multiprocessor for graphics.

4. An integrated circuit chip as in claim 3, wherein said multiprocessor for graphics includes at least one of a plurality of graphic engines.

* * * * *